United States Patent [19]

Gomez et al.

[11] Patent Number: 5,380,635

[45] Date of Patent: Jan. 10, 1995

[54] DIHYDROPERIMIDINE SQUARYLIUM DYES AS ANTIHALATION AND ACUTANCE MATERIALS FOR PHOTOGRAPHIC AND PHOTOTHERMOGRAPHIC ARTICLES

[75] Inventors: Charles W. Gomez, Cottage Grove; Lori S. Harring, Woodbury; Randall H. Helland, Lake Elmo; William D. Ramsden, Afton, all of Minn.; Tran Van Thien, Harlow, England

[73] Assignee: Minnesota Mining and Manufacturing Company, St. Paul, Minn.

[21] Appl. No.: 203,120

[22] Filed: Feb. 28, 1994

[51] Int. Cl.$^6$ .................................................. G03C 1/06
[52] U.S. Cl. ...................................... 430/517; 430/510; 430/944
[58] Field of Search ................. 430/517, 510, 573, 944

[56] References Cited

U.S. PATENT DOCUMENTS

| | | | |
|---|---|---|---|
| 4,312,941 | 1/1982 | Scharf et al. | 430/510 |
| 4,581,323 | 4/1986 | Fisher et al. | 430/513 |
| 4,581,325 | 4/1986 | Kitchin et al. | 430/522 |
| 5,245,045 | 9/1993 | Hall et al. | 548/365.1 |
| 5,312,722 | 5/1994 | Harada | 430/517 |

FOREIGN PATENT DOCUMENTS

| | | |
|---|---|---|
| 0102781 | 2/1988 | European Pat. Off. . |
| 0329491 | 2/1989 | European Pat. Off. . |
| 0377961 | 11/1989 | European Pat. Off. . |
| 0569857 | 5/1993 | European Pat. Off. . |

*Primary Examiner*—Jack P. Brammer
*Attorney, Agent, or Firm*—Gary L. Griswold; Waltern N. Kirn; Mark A. Litman

[57] ABSTRACT

Dihydroperimidine squarylium dyes have been found to be particularly effective when used in acutance and antihalation systems for photothermographic and photographic articles.

21 Claims, No Drawings

DIHYDROPERIMIDINE SQUARYLIUM DYES AS ANTIHALATION AND ACUTANCE MATERIALS FOR PHOTOGRAPHIC AND PHOTOTHERMOGRAPHIC ARTICLES

BACKGROUND TO THE INVENTION

1. Field of the Invention

This invention relates to squarylium dyes useful as antihalation and acutance materials for photographic and photothermographic articles.

2. Background of the Art

Light-sensitive recording materials, such as photographic and photothermographic articles, frequently suffer from a phenomenon known as halation which causes degradation in the quality of the recorded image. These light sensitive recording materials typically comprise a photosensitive layer and a substrate such as film base. Image quality degradation occurs when a fraction of the imaging light which strikes the photosensitive layer is not absorbed, but instead passes through to the film base on which the photosensitive layer is coated. A portion of the light reaching the base may be reflected back to strike the photosensitive layer from the underside. This reflected light may, in some cases, contribute significantly to the total exposure of the photosensitive layer. Any particulate matter (including silver halide grains) in the photosensitive element may also cause light passing through the element to be scattered. Scattered light which is reflected from the film base will, on its second passage through the photosensitive layer, cause exposure over an area adjacent to the point of intended exposure. This effect leads to reduced image sharpness and image degradation. Silver-halide based photographic materials (including photothermographic materials) are prone to this form of image degradation since the photosensitive layers contain light-scattering particles (see, T. N. James, *The Theory of the Photographic Process*, 4th Edition, Chapter 20, MacMillan 1977).

In order to improve the image sharpness of photographic materials, it is customary to incorporate into one or more layers of the material a dye which absorbs light that has been scattered within the coating and would otherwise lead to reduced image sharpness. To be effective, the absorption of this dye must be at about the same wavelength as the sensitivity of the photosensitive layer.

In the case of imaging materials coated on a transparent base, a light-absorbing layer is frequently coated in a separate backing layer or underlayer on the reverse side of the substrate from the photosensitive layer. Such a coating, known as an "antihalation layer," effectively reduces reflection of light which has passed through the photosensitive layer. A similar effect may be achieved by interposing a light-absorbing layer between the photosensitive layer and the substrate. This construction, known in the art as an "antihalation underlayer" is applicable to photosensitive coatings on non-transparent as well as on transparent substrates.

It is also possible to improve image quality by coating a light-absorbing layer above the photosensitive layer of a photographic element. Coatings of this kind, described in U.S. Pat. Nos. 4,312,941; 4,581,323; and 4,581,325; reduce multiple reflections of scattered light between the internal surfaces of a photographic element.

A light-absorbing substance may also be incorporated into the photosensitive layer itself in order to absorb scattered light. Substances used for this purpose are known as "acutance dyes."

Essentially any dye which absorbs light at the wavelength of interest can be used as an antihalation dye, and potentially, as an acutance dye. The restraints on the choice of acutance dyes are greater as the dye must not interfere with the imaging chemistry. Typically this means that the dye cannot cause fogging of the silver in the imaging layer. Some recent patents dealing with antihalation and acutance dyes include U.S. Pat. No. 4,581,325; EP 0,102,781 A2; EP 0,377,961 A1; EP 0,329,491 A2; EP 0,397,435 A1.

Many substances are known which absorb visible and/or ultraviolet light, and many are suitable for image improvement purposes in conventional photographic elements sensitized to wavelengths below 700 nm. However, the use of semiconductor light sources, and particularly laser diodes which emit in the red and near-infrared region of the electromagnetic spectrum, as sources for output of electronically stored image data onto photosensitive film or paper is becoming increasingly widespread. This has led to a need for high quality imaging materials which are sensitive in the near infrared region.

The classes of organic dyes which are commonly employed for antihalation or acutance purposes in ultraviolet and visible light sensitive materials do not readily form stable derivatives and analogues which absorb strongly in the near-infrared. References to visible light herein refer to wavelengths between 400 and 700 nm and references to near-infrared light refer to wavelengths between 700 and 1400 nm, especially 750 to 1300 nm.

Since the human eye is insensitive to near-infrared radiation, coatings of dyes which absorb only at wavelengths longer than 700 nm appear colorless and would therefore be acceptable in imaging materials without any change in absorption during processing. Dyes of this type would be suitable as antihalation and/or acutance dyes in infrared sensitive imaging articles. Heptamethine and longer chain cyanine dyes are known which have absorption maxima in the near-infrared region of the spectrum. However, simple near-infrared absorbing cyanine dyes exhibit an absorption curve which is broadened on the short wavelength side and extends well into the visible region of the spectrum (see for example A. Weissberger and E. C. Taylor *Special Topics in Heterocyclic Chemistry*, John Wiley and Sons, 1977, page 540). This extended absorption curve into the visible results in an objectionably high blue or green appearance which requires further processing to decolorize or dissolve out the dyes.

U.S. Pat. No. 4,581,325 discloses a group of heptamethine cyanine dyes having a cyclopentene ring in the polymethine chain which are suitable for use as antihalation or acutance dyes in both photographic and photothermographic materials. European Patent Application 377 961 discloses use of polymethine dyes of a particular formula as alternative near infrared antihalation or acutance dyes in either photographic or photothermographic articles.

Unfortunately, these dyes also have tails or some absorption in the visible region of the spectrum and, thus, display a slight purple tint. This tint is undesirable and prevents production of the photographic or photothermographic articles using a clear substrate or film base. Instead a film base with a slight tint is used to counteract the tint of the antihalation or acutance dye.

European Patent Application 569 857 discloses dyes which may be used as infrared or near infrared antihalation dyes in photographic materials. However, once again, the reference teaches that the dyes must be decolored or dissolved out during photographic processing.

It would be desirable to have dyes that absorb strongly in the near infrared yet display little or no coloration in the visible region. These dyes should not interfere or inhibit the effectiveness of the construction during imaging, and, preferably, are easy to prepare.

Some dihydroperimidine squarylium dyes have been known for a number of years. In fact, squaraine dyes containing 2,3-dihydroperimidine terminal groups have been disclosed to absorb light in the near infrared region. K. A. Bello; N. Corns; J. Griffiths, *J. Chem. Soc., Chem. Commun.*, 1993, 452–454. However, this article discusses only the absorbance of the dyes in solvent. In addition, the data shown indicates some residual absorbance of the dye in the visible region. Finally, the article contains no discussion nor suggestion of use of dihydroperimidine squarylium dyes as either antihalation or acutance dyes.

SUMMARY OF THE INVENTION

We have discovered that dihydroperimidine squarylium dyes are useful in antihalation layers or as acutance dyes in a photothermographic (dry silver) or photographic article. These dyes absorb radiation in the near-infrared region, from 750 to 850 nm, and impart only a very low degree of visible coloration to the photographic or photothermographic article, while improving image sharpness. The coloration that is imparted to the photographic or photothermographic article by these dyes tends to be quite neutral, frequently gray or grayish-brown. Thus, use of dihydroperimidine squarylium dyes as antihalation or acutance dyes enables use of clear substrates or base films in the radiation sensitive articles.

The present invention provides a support bearing an electromagnetic-radiation-sensitive photographic silver halide material and a dihydroperimidine squarylium dye having the nucleus:

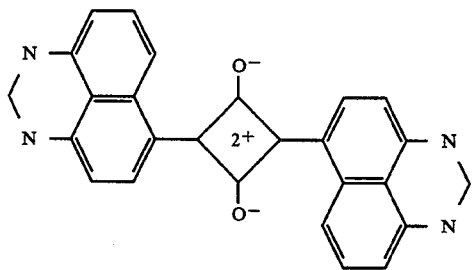

The dihydroperimidine dye may be used in an antihalation layer, as an acutance agent, or as both an acutance agent and an antihalation dye.

According to one preferred embodiment, the dihydroperimidine squarylium dyes used as antihalation or acutance dyes, have the nucleus:

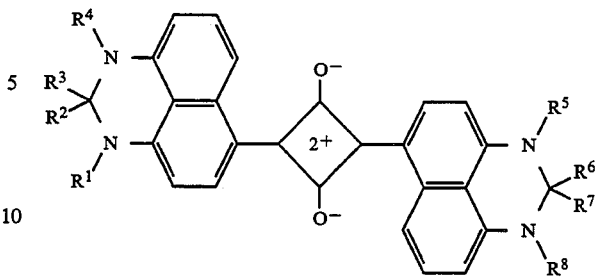

wherein $R^1$, $R^2$, $R^3$, $R^4$, $R^5$, $R^6$, $R^7$, and $R^8$ each independently represent hydrogen, an alkyl group having from 1–20 carbon atoms, a cycloalkyl group having from 1–20 carbon atoms, an aryl group having up to 14 carbon atoms, an aralkyl group, or $R^1$ and $R^2$, and/or $R^3$ and $R^4$, and/or $R^5$ and $R^6$ and/or $R^7$ and $R^8$; or $R^2$ and $R^3$ and/or $R^6$ and $R^7$ are bonded together to form a 5-, 6-, or 7-membered ring.

According to another preferred embodiment, the dihydroperimidine squarylium dyes used as an antihalation or acutance dye, have the nucleus:

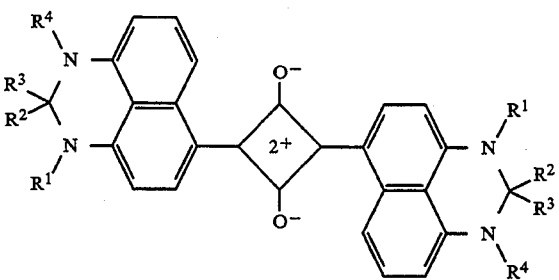

wherein $R^1$, $R^2$, $R^3$, and $R^4$ each independently represent hydrogen, an alkyl group having from 1–20 carbon atoms, a cycloalkyl group having from 1–20 carbon atoms, an aryl group having up to 14 carbon atoms, an aralkyl group, or $R^1$ and $R^2$, and /or $R^3$ and $R^4$, or $R^2$ and $R^3$ are bonded together to form a 5-, 6-, or 7-membered ring.

When a general structure is referred to as "a compound having the nucleus of" a given formula, any substitution which does not alter the bond structure of the formula or the shown atoms within that structure, is included within that structure. For example, where there is a polymethine chain shown between two defined heterocyclic nuclei, substituent groups may be placed on the chain or on the heterocyclic nucleus, but the conjugation of the chain may not be altered and the atoms shown in the heterocyclic nuclei may not be replaced.

When a general structure is referred to as "a general formula" it does not specifically allow for such broad substitution of the structure.

As is well understood in this area, substitution is not only tolerated, but is often advisable and substitution is anticipated on the compounds used in the present invention. As a means of simplifying the discussion and recitation of certain terminology used throughout this application, the terms "group" and "moiety" are used to differentiate between chemical species that allow for substitution or which may be substituted and those which do not so allow or may not be so substituted. Thus, when the term "group" is used to describe a chemical compound or substituent, the described chemical material includes the basic group and that group with conventional substitution. Where the term "moiety" is used to describe a chemical compound or substituent, only an unsubstituted chemical material is intended to be included. For example, the phrase "alkyl group" is intended to include not only pure open-chain and cyclic saturated hydrocarbon alkyl substituents, such as methyl, ethyl, propyl, t-butyl, cyclohexyl, adamantyl, octadecyl, and the like, but also alkyl substituents bearing further substituents known in the art, such as hydroxyl, alkoxy, vinyl, phenyl, halogen atoms (F, Cl, Br, and I), cyano, nitro, amino, carboxyl, etc. On the other hand, the phrase "alkyl moiety" is limited to the inclusion of only pure open-chain and cyclic saturated hydrocarbon alkyl substituents, such as methyl, ethyl, propyl, t-butyl, cyclohexyl, adamantyl, octadecyl, and the like. Substituents which react with active ingredients, such as very strongly electrophilic or oxidizing substituents, would of course be excluded by the ordinary skilled artisan as not being inert or harmless.

Other aspects, advantages, and benefits of the present invention are apparent from the detailed description, examples and claims.

DETAILED DESCRIPTION OF THE INVENTION

The Squarylium Dye

According to one preferred embodiment, the dihydroperimidine squarylium dyes used as an antihalation or acutance dye, have the nucleus:

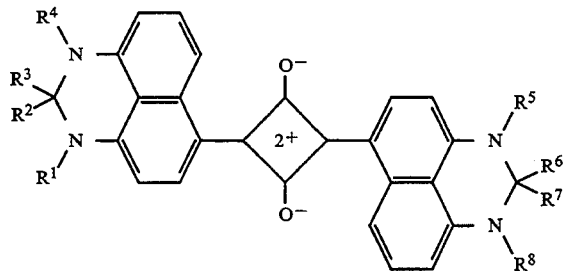

wherein
$R^1$, $R^2$, $R^3$, $R^4$, $R^5$, $R^6$, $R^7$, and $R^8$ each independently represent hydrogen, an alkyl group having from 1–20 carbon atoms, a cycloalkyl group having from 1–20 carbon atoms, an aryl group having up to 14 carbon atoms, an aralkyl group, or $R^1$ and $R^2$, and/or $R^3$ and $R^4$, and/or $R^5$ and $R^6$ and/or $R^7$ and $R^8$; or $R^2$ and $R^3$ and/or $R^6$ and are bonded together to form a 5-, 6-, or 7-membered ring.

According to another preferred embodiment, the dihydroperimidine squarylium dyes used as antihalation or acutance dyes, have the general formula:

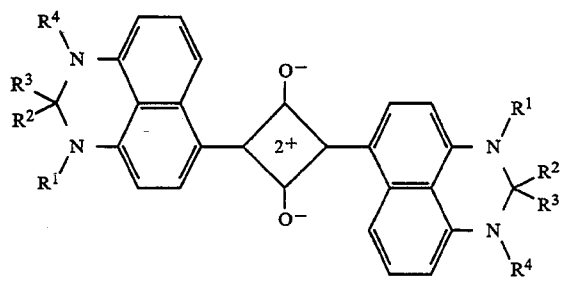

wherein
$R^1$, $R^2$, $R^3$, and $R^4$ each independently represent hydrogen, an alkyl group having from 1–20 carbon atoms, a cycloalkyl group having from 1–20 carbon atoms, an aryl group having up to 14 carbon atoms, an aralkyl group, or $R^1$ and $R^2$, and/or $R^3$ and $R^4$, or $R^2$ and $R^3$ are bonded together to form a 5-, 6-, or 7-membered ring.

According to one especially preferred embodiment $R^1$ and $R^4$ are hydrogen and $R^2$ and $R^3$ independently represent an alkyl group having from 1–20 carbon atoms, a cycloalkyl group having from 1–20 carbon atoms, an aralkyl group, an aryl group, or $R^2$ and $R^3$ taken together form a 5-, 6-, or 7-membered ring. Representative, non-limiting dyes according to this preferred embodiment are:

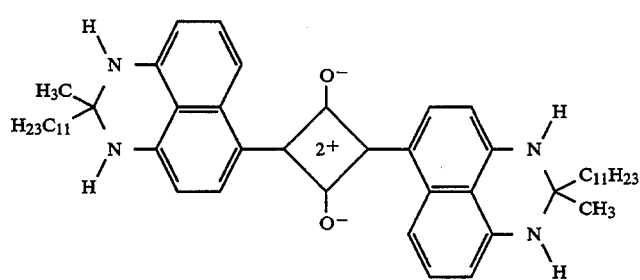

1a

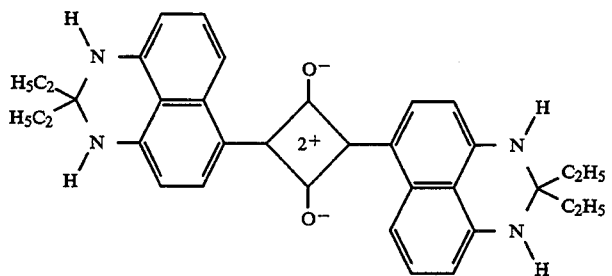
1b
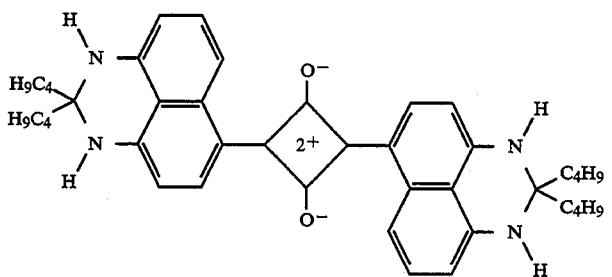
1c
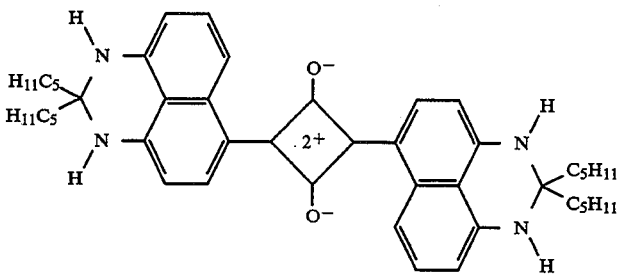
1d
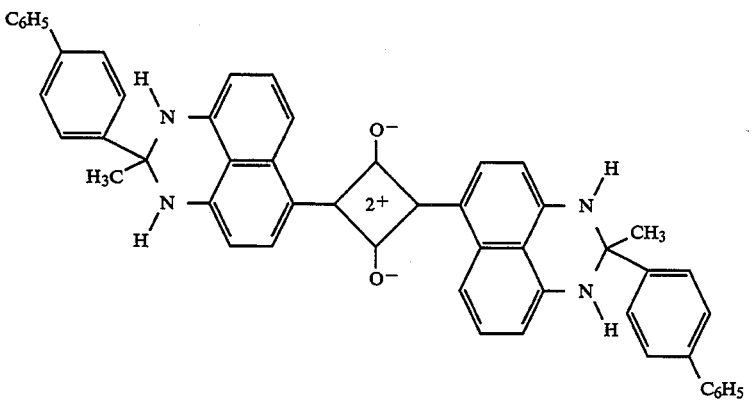
1e
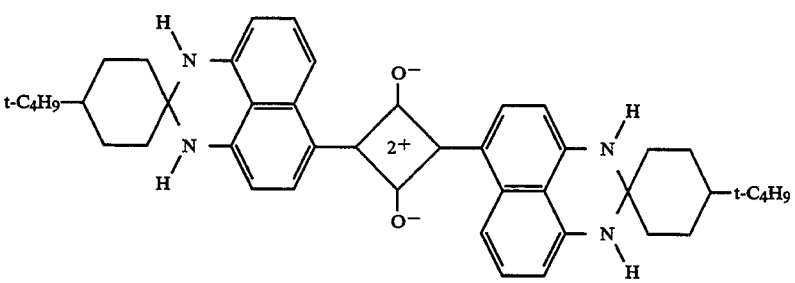
1f
According to yet another preferred embodiment $R^3$ and $R^4$ are taken together to form a cycloalkyl group having 1–20 carbon atoms, $R^2$ is an aryl group and $R^1$ is hydrogen. A preferred but non-limiting example includes:

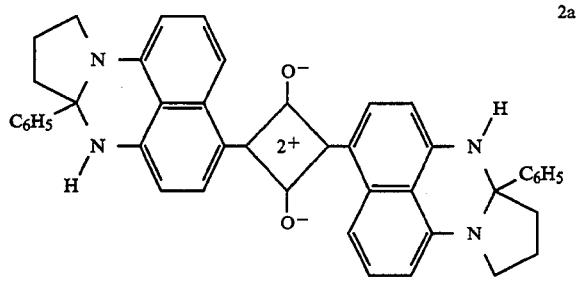

2a

According to yet a third preferred embodiment, $R^3$ and $R^4$ are taken together to form a lactam group, $R^2$ is an alkyl or an aryl group and $R^1$ is H. Representative dyes according to this embodiment are:

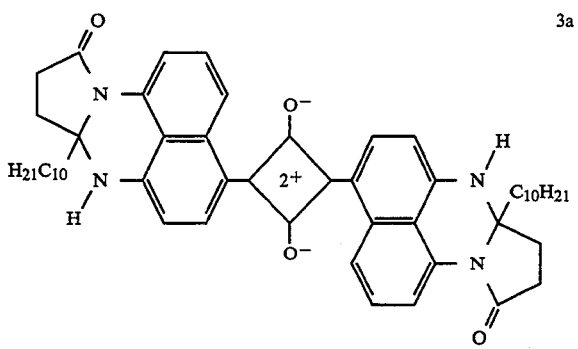

3a

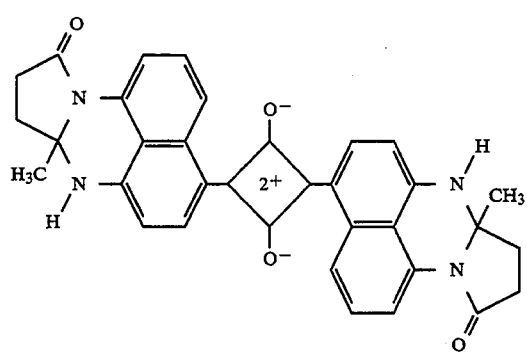

3b

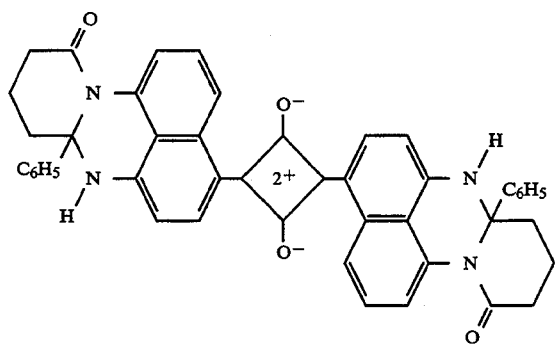

3c

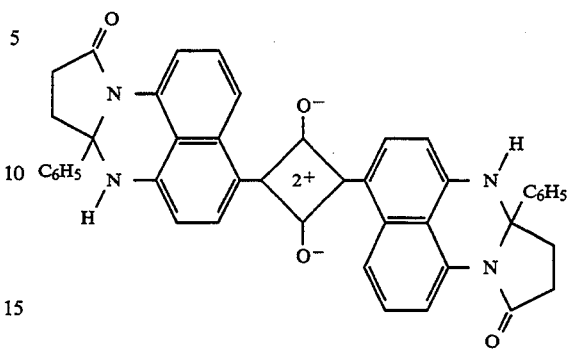

3d

Other examples of embodiments of dyes suitable for use as near infrared antihalation or acutance dyes may include dyes wherein $R^1$ and $R^2$ as well as $R^3$ and $R^4$ are taken together to form cycloalkyl groups. Dyes of this type can be prepared by reaction of a $\omega,\omega$-dihaloketone with a 1,8-diaminonaphthalene, followed by condensation with squaric acid.

Still other examples of embodiments of dyes suitable for use as antihalation or acutance dyes may include, dyes wherein $R^1$ and $R^2$ are taken together to form a lactam group, while $R^3$ and $R^4$ are taken together to form a cycloalkyl group. Dyes of this type can be prepared by reaction of a $\omega$-halo-keto-carboxylic ester with a 1,8-diaminonaphthalene, followed by condensation with squaric acid.

Selection of the appropriate substituent groups, $R^1$–$R^4$ may enable one to shift the peak absorption wavelength. For example, dyes of the type exemplified by structures 3a–3d have wavelength absorptions shifted 10–15 nm to shorter wavelengths from those exemplified by structures 1a–1f.

The squarylium dyes exemplified by structures 1a–1f may be prepared by condensing a ketone or an aldehyde with a 1,8-diaminonaphthalene in the presence of an acid catalyst, in a solvent such as toluene, under reflux conditions, with removal of the water from the reaction mixture as it is formed. The resultant dihydroperimidine product is typically isolated by distillation. The dihydroperimidine, is then heated at reflux with squaric acid, [also known as 3,4-dihydroxy-3-cyclobutene-1,2-dione] in a mixture of toluene and n-butanol, again with removal of the liberated water as it is formed. The product, isolated by addition of petroleum ether and filtration, can be purified by chromatography and/or recrystallization. The preparation of dyes of this type is shown in Scheme 1.

Scheme 1

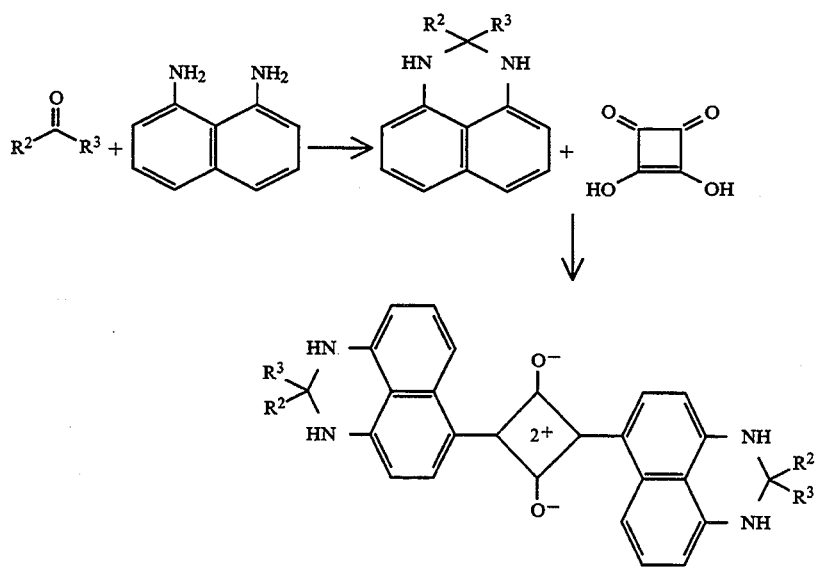

Dyes in which $R^3$ and $R^4$ form a carbocyclic ring are similarly prepared. Thus, condensation of a ω-halo-ketone with a 1,8-diaminonaphthalene gives a ring fused dihydroperimidine. Reaction of this material with squaric acid gives dyes exemplified by structure 2a. The preparation of dyes of this type is shown in Scheme 2. In Scheme 2, n is an integer which represents the number of methine groups necessary to complete a 5-, 6-, or 7-membered ring.

Dyes in which $R^3$ and $R^4$ form a lactam are prepared by condensing a keto-carboxylic acid derivative (typically a keto-ester) with a 1,8-diaminonaphthalene to give a lactam fused dihydroperimidine. Reaction of this material with squaric acid gives dyes exemplified by structures 3a–3d. The preparation of dyes of this type is shown in Scheme 3. In Scheme 3, m is an integer which represents the number of methine groups necessary to complete the 5-, 6-, or 7-membered ring.

Scheme 2

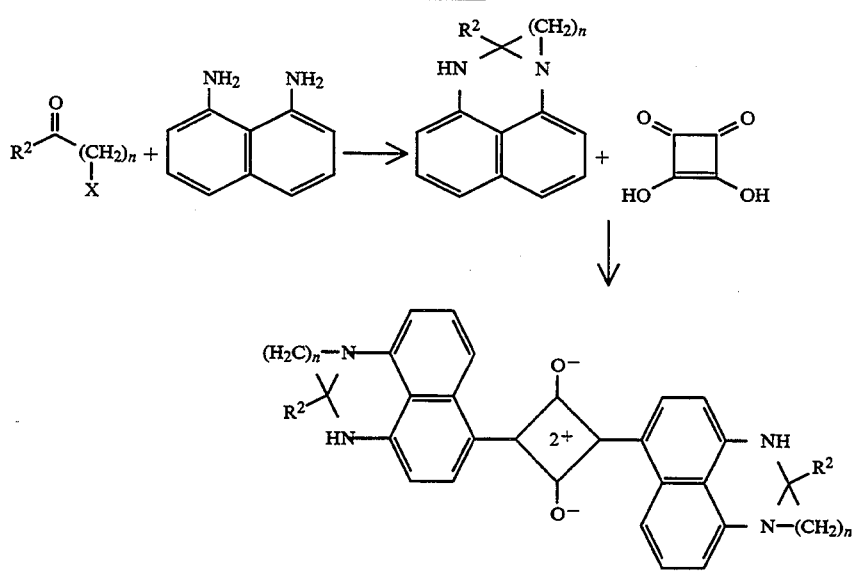

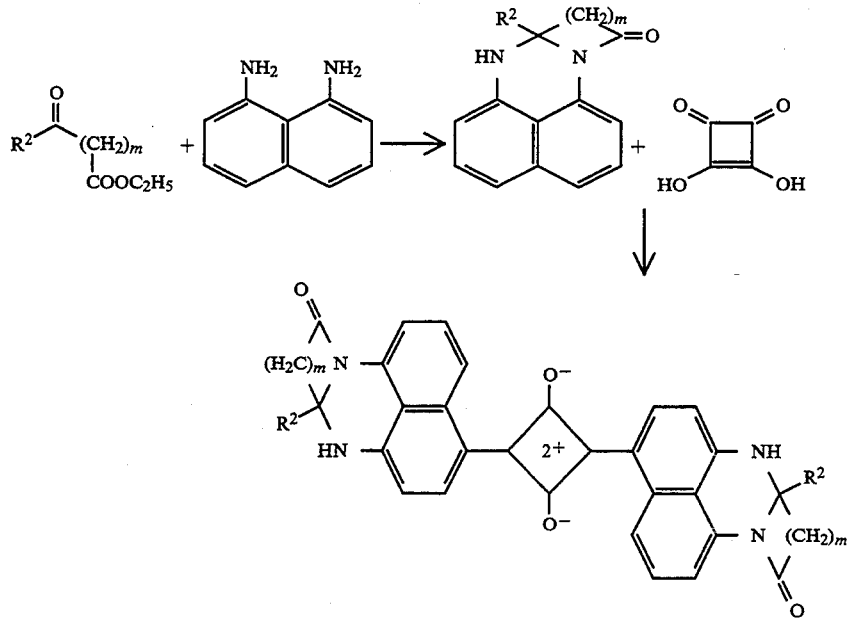

Scheme 5

Antihalation and Acutance Constructions

The dihydroperimidine squarylium dye may be used in an antihalation coating for photothermography or photography or it may be used as an acutance or filter dye. The type of photothermographic element used in the invention is not critical. Examples of suitable photothermographic elements include dry silver systems (see, for example U.S. Pat. Nos. 3,457,075 and 5,258,274, both incorporated herein by reference) and diazo systems.

When used for antihalation purposes, the dihydroperimidine squarylium dye is usually coated together with an organic binder as a thin layer on a substrate and is present in a layer separate from the light-sensitive layer. The antihalation layer may be positioned above, below, or both above and below the light-sensitive layer, and if the support is transparent, an antihalation layer may be positioned on the surface of the support opposite the light-sensitive layer. When positioned above the light sensitive layer the antihalation layer may alternatively be called a filter layer. When used for acutance purposes, the dihydroperimidine squarylium dyes are incorporated within the light-sensitive layer according to conventional techniques.

Whether used as an antihalation, acutance, or filter dye, in photographic or photothermographic elements, it is preferred to incorporate dyes in an amount sufficient to provide an optical density of from 0.05 to 3.0, more preferably from 0.1 to 2, absorbance units at $\lambda_{max}$ of the dye. The coating weight of the dye is generally from 0.001 to 1 g/m$^2$, preferably 0.001 to 0.05 g/m$^2$. When used in a separate layer, a wide variety of polymers are suitable for use as the binder. Non-limiting examples of these polymers include cellulose acetate butyrate, polyvinyl butyral, poly(vinylidene chloride), cellulose acetate, and various acrylic polymers.

In certain situations, absorption at a variety of wavelengths may be desirable. If so, more than one dye can be used. The dyes may be incorporated into the photosensitive element in any known configuration. For example, each dye may be in an independent antihalation layer, more than one dye may be contained in one antihalation layer, one dye may be an acutance dye while the other is used in an antihalation layer, etc.

The dyes of the present invention do not contribute undesirable coloration to the photosensitive articles in which they are used. Although a tint may be seen, it is typically a neutral color, frequently grayish to grayish brown. Thus, these dyes are useful on clear as well as tinted substrates.

EXAMPLES

All materials for which preparation procedures are not given were obtained commercially, many from Aldrich Chemical Co., Milwaukee, Wis. Synthesized compounds were characterized such as by their $^1$H and $^{13}$C NMR, and IR spectra. The following additional terms and materials were used.

Acryloid TM A-21 is a poly(methyl methacrylate) available from Rohm and Haas, Philadelphia, Pa.

Antimottle Agent-1 is a terpolymer of N-ethyl-perfluorooctanesulfonamidoethyl methacrylate, hydroxyethyl methacrylate, and acrylic acid, and is disclosed in Applicants' Assignees U.S. patent application Ser. No. 08/104,888 (filed Aug. 10, 1993).

Antistatic Agent-1 is disclosed in U.S. patent application Ser. No. 08/183,058 (filed Jan. 18, 1994).

Butvar TM B-76 and Butvar TM B-79 are poly(vinyl butyral) resins available from Monsanto Company, St. Louis, Mo.

CAB 171-15S and CAB 381-20 are cellulose acetate butyrate resins available from Eastman Kodak Co.

CBBA is 2-(4-chlorobenzoyl)benzoic acid.

MEK is methyl ethyl ketone (2-butanone).

MMBI is 5-methyl-2-mercaptobenzimidazole.

Permanax WSO is 1,1-bis(2-hydroxy-3,5-dimethylphenyl)-3,5,5-trimethylhexane [CAS RN=7292-14-0] and is available from Vulnax International, Ltd. It is also known as Nonox.

PHP is pyridinium hydrobromide perbromide.

PHZ is phthalazine.

PET is poly(ethylene terephthalate).

Syloid 74-X 6000 is a silica available from W. R. Grace.

THDI is Desmodur ™ N-3300, a biuretized hexamethylene diisocyanate available from Mobay Chemical Co.

Example 1

Preparation of Dyes 1a–1f

Preparation of Dihydroperimidine Intermediate

A stirred mixture of 26.05 g of 1,8-diaminonaphthalene, 32.66 g of 2-tridecanone, 55 mg of p-toluenesulfonic acid monohydrate, and 250 mL of toluene was heated to reflux under a nitrogen atmosphere using a Dean-Stark trap to remove the water evolved from the reaction for 5 hr. The mixture was then washed with saturated sodium bicarbonate solution, dried over anhydrous potassium carbonate, filtered, and the solvent removed under reduced pressure. The product was distilled to yield 48.86 g of dihydroperimidine intermediate, bp 192°–213° C. at 0.3 to 0.4 torr.

Preparation of Dye 1a

A stirred mixture of 8.00 g of the dihydroperimidine intermediate prepared above, 1.48 g of squaric acid, 64 mL of n-butanol, and 64 mL of toluene was heated to reflux under a nitrogen atmosphere using a Dean-Stark trap to remove the water evolved from the reaction for 3 hr. The mixture was filtered, poured into 600 mL of petroleum ether (bp 35°–60° C.), and kept at 5° C. for 18 hr. The product filtered off, washed with petroleum ether, and air dried to give 6.45 g of dye (1a). The dye could be further purified by recrystallization from tetrahydrofuran (THF)/petroleum ether mixtures. The absorption maximum in ethyl acetate was at $\lambda_{max}=802$ nm ($\epsilon=1.8\times10^5$).

In a similar manner, dye 1b was prepared using 3-pentanone as the ketone to prepare the dihydroperimidine intermediate. The absorption maximum of dye 1b in methyl ethyl ketone was at $\lambda_{max}=810$ nm ($\epsilon=2.0\times10^5$).

In a similar manner, dye 1c was prepared using 5-nonanone as the ketone to prepare the dihydroperimidine intermediate. The absorption maximum of dye 1c in methyl ethyl ketone was at $\lambda_{max}=813$ nm ($\epsilon=1.8\times10^5$).

In a similar manner, dye 1d was prepared using 6-undecanone as the ketone to prepare the dihydroperimidine intermediate. The absorption maximum of dye 1d in methyl ethyl ketone was at $\lambda_{max}=813$ nm ($\epsilon=1.8\times10^5$).

In a similar manner, dye 1e was prepared using 4-acetyl biphenyl as the ketone to prepare the dihydroperimidine intermediate. The absorption maximum of dye 1e in methyl ethyl ketone was at $\lambda_{max}=816$ nm ($\epsilon=7.3\times10^4$).

In a similar manner, dye 1f was prepared using 4-t-butylcyclohexanone as the ketone to prepare the dihydroperimidine intermediate. The absorption maximum of dye 1f in methyl ethyl ketone was at $\lambda_{max}=812$ nm ($\epsilon=1.4\times10^5$).

Example 2

Preparation of Dye 2a

Preparation of Ring-Fused Dihydroperimidine Intermediate

A stirred mixture of 1.411 g of 1,8-diaminonaphthalene, 1.629 g of 4-chlorobutyro-phenone, 3 mg of p-toluenesulfonic acid monohydrate, and 10 mL of toluene was heated to reflux under a nitrogen atmosphere using a Dean-Stark trap to remove the water evolved from the reaction for 10 hr. The mixture was filtered to remove unreacted starting material, partioned between ethyl acetate and 5% sodium hydroxide solution, dried over anhydrous magnesium sulfate, filtered, and concentrated in vacuo to give 2.04 g of crude product. This was further purified by chromatography on silica gel, eluting with 1:1 diethyl ether/petroleum ether, and collecting the initial band to yield 0.719 g of dihydroperimidine intermediate.

Preparation of Dye 2a 1 mL of n-butanol and 67 mg of squaric acid were heated to reflux under a nitrogen atmosphere. When all of the squaric acid had dissolved, 0.335 g of the dihydroperimidine intermediate prepared above, and 3 mL of toluene were added and the stirred mixture heated to reflux under a Dean-Stark trap with water removal for 6.3 hr. The mixture was cooled, 10 mL of petroleum ether added, and let sit for 18 hr. The precipitated solid was filtered off, washed with petroleum ether, and air dried to yield 0.353 g of dye 2a. The absorption maximum in ethyl acetate was at 820 nm.

Example 3

Preparation of Dyes 3a–3d

Preparation of Lactam Dihydroperimidine Intermediate

A stirred mixture of 1.193 g of ethyl 4-oxotetradecanoate (prepared by the general procedure of Patrick and Erickson, *Organic Syntheses*, Collective Volume 4, 430–432 (1963)), 0.749 g of 1,8-diaminonaphthalene, 3 mg of p-toluenesulfonic acid monohydrate, and 7 mL of toluene was heated to reflux under a nitrogen atmosphere using a Dean-Stark trap to remove the water evolved from the reaction for 4.7 hr. The solvent was removed in vacuo, and the residue chromatographed on silica gel eluted with 3:1 diethyl ether/petroleum ether to yield 1.366 g of lactam dihydroperimidine intermediate as the initial band.

Preparation of Dye 3a

A stirred mixture of 1.366 g of lactam dihydroperimidine intermediate prepared above, 0.210 g of squaric acid, 5 mL of n-butanol, and 15 mL of toluene were heated at reflux under nitrogen using a Dean-Stark trap to remove the water evolved from the reaction for 1 hr. Petroleum ether was added to give a total volume of 100 mL, and the precipitated dye, 3a, 0.634 g, filtered off, washed with petroleum ether, and air dried. The absorption maximum in ethyl acetate was 792 nm ($\epsilon=2.7\times10^5$).

In a similar manner, dye 3b was prepared using ethyl 4-oxopentanoate as the ketone to prepare the lactam dihydroperimidine intermediate. The absorption maximum of dye 3b in ethyl acetate was at $\lambda_{max}=785$ nm ($\epsilon=5.9\times10^4$).

In a similar manner, dye 3c was prepared using ethyl 5-phenyl-5-oxopentanoate as the ketone to prepare the dihydroperimidine intermediate. The absorption maximum of dye 3c in ethyl acetate was at $\lambda_{max}=795$ nm ($\epsilon=6.9\times10^4$).

In a similar manner, dye 3d was prepared using ethyl 4-phenyl-4-oxobutyrate as the ketone to prepare the dihydroperimidine intermediate. The absorption maximum of dye 3d in tetrahydrofuran was at $\lambda_{max}=800$ nm ($\epsilon=1.2\times10^5$).

Evaluation of the Dyes in Antihalation Layers and as Acutance Dyes

Example 4

Preparation of Control

The following sample was prepared with no squarylium dye present as either an antihalation or acutance material. It serves as a control.

A preformed photothermographic soap was prepared as follows:

Preparation of Core-Shell-Type Silver Iodobromide Emulsion

A core-shell-type silver halide emulsion was prepared as described in Applicants' Assignees U.S. patent application entitled "Photothermographic Element with Core-Shell Type Silver Halide Grains" (Attorney Docket File No. 49685 USA 7A, filed Feb. 22, 1994). To a first solution (Solution A) having 50–100 g of phthalated gelatin dissolved in 1500 ml of deionized water, held at a temperature between 30°–38° C., were simultaneously added; a second solution (Solution B) containing potassium bromide and potassium iodide, and a third solution (Solution C) which was an aqueous solution containing 1.4 to 1.8 moles silver nitrate per liter. pAg was held at a constant value by means of a pAg feedback control loop as described in Research Disclosure No. 17643, U.S. Pat. Nos. 3,415,650; 3,782,954; and 3,821,002. After a certain percentage of the total delivered silver nitrate was added, the second halide solution (Solution B), was replaced with Solution D which contains potassium bromide; and Solution C was replaced with Solution E. In this manner a core of silver bromide/silver iodide with a shell of silver bromide was obtained.

The size of the emulsion grains was adjusted by controlling the addition rates, silver nitrate concentration, gelatin concentration in the kettle, and the kettle temperature.

The procedure for the preparation of 2 moles of emulsion is shown below.

| Solution A was prepared at 30° C. as follows: | |
|---|---|
| gelatin | 50 g |
| deionized Water | 1500 ml |
| 0.1M KBr | 6 ml |
| adjust to pH = 5.0 with 3N HNO3 | |
| Solution B was prepared at 25° C. as follows: | |
| KBr | 27.4 g |
| KI | 3.3 g |
| deionized Water | 275.0 g |
| Solution C was prepared at 25° C. as follows: | |
| AgNO3 | 42.5 g |
| deionized Water | 364.0 g |

Solutions B and C were jetted into Solution A over 9.5 minutes.

| Solution D was prepared at 25° C. as follows: | |
|---|---|
| KBr | 179. g |
| deionized Water | 812. g |
| Solution E was prepared at 25° C. as follows: | |
| AgNO3 | 127. g |
| deionized Water | 1090. g |

Solutions D and E were jetted into Solution A over 28.5 minutes.

The emulsions were washed with water and then desalted. The average grain size was 0.035 µm. Silver halide grain size was determined by Scanning Electron Microscopy (SEM).

Preparation of Preformed Silver Halide/Silver Organic Salt Dispersion

A silver halide/silver organic salt dispersion was prepared as described below. This material is also referred to as a silver soap dispersion or emulsion.

I. Ingredients

1. Preformed silver halide core-shell type emulsion prepared above—0.22 mole at 700 g/mole in 1.25 liter H2O at 42° C.
2. NaOH 89.18 g in 1.50 liter H2O
3. AgNO3 364.8 g in 2.5 liter H2O
4. Fatty acid 131 g (Humko Type 9718) [available from Witco. Co., Memphis, Tenn.]
5. Fatty acid 634.5 g (Humko Type 9022) [available from Witco. Co., Memphis, Tenn.]
6. HNO3 19 ml in 50 ml H2O II. Reaction 1. Dissolve ingredients #4 and #5 at 80° C. in 13 liter of H2O and mix for 15 minutes.
2. Add ingredient #2 to Step 1 at 80° C. and mix for 5 minutes to form a dispersion.
3. Add ingredient #6 to the dispersion at 80° C., cooling the dispersion to 55° C. and stirring for 25 minutes.
4. Add ingredient #1 to the dispersion at 55° C. and mix for 5 minutes.
5. Add ingredient #3 to the dispersion at 55° C. and mix for 10 minutes.
6. Wash until wash water has a resistivity of 20,000 ohm/cm².
7. Dry at 45° C. for 72 hours.

Homogenization of Preformed Soaps (Homogenate)

A preformed silver fatty acid salt homogenate was prepared by homogenizing 200 g of pre-formed soap, prepared above, in solvent and Butvar TM B-76 poly(vinyl butyral) according to the following procedure.

1. Add 200 g of preformed soap to 350 g of toluene, 1116 g of 2-butanone, and 33 g of Butvar TM B-76.
2. Mix the dispersion for 10 minutes and hold for 24 hours.
3. Homogenize at 4000 psi.
4. Homogenize again at 8000 psi.

Sensitizing Dye-1 has the structure shown below.

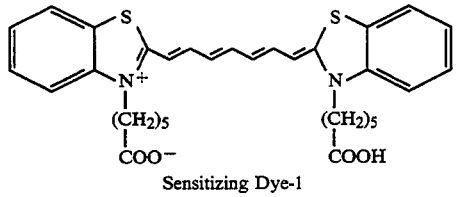

Sensitizing Dye-1

A photothermographic coating mixture was prepared containing the following components:

| Charge | Material | wt % |
|---|---|---|
| A | Preformed photothermographic soap | 78.37 |
| B | Pyridinium bromide perbromide | 0.04 |

-continued

| Charge | Material | wt % |
|---|---|---|
| B | Methanol | 0.20 |
| C | Calcium bromide dihydrate | 0.03 |
| C | Methanol | 0.20 |
| D | Sensitizing Dye 1 | 0.01 |
| D | 2-Mercapto-5-methylbenzimidazole | 0.05 |
| D | 2-(4-Chlorobenzoyl)benzoic acid | 0.58 |
| E | Polyvinylbutyral (Butvar TM B-79) | 12.98 |
| F | 2-tribromomethyl-sulfonyl quinaldine | 0.36 |
| G | Permanax WSO | 3.39 |
| H | Desmodur N 3300 | 0.09 |
| I | Phthalazine | 0.33 |
| I | Tetrachlorophthalic acid | 0.011 |
|   |   | 100.00% |

A 700 g batch of coating material was prepared as follows: Under red safelight conditions, charge A was added to a 1200 mL beaker equipped with baffles and a stirrer. The beaker was placed in a constant temperature bath maintained at 70° F. (21.1° C.) and stirred at 600 rpm. Charge B was prepared and added to charge A. Stirring was maintained for 60 minutes. Charge C was prepared and added to the reaction mixture. Stirring was maintained for 30 minutes. The safelights were changed to infrared safelights. Charge D was prepared and added to the reaction mixture. Stirring was maintained for 60 minutes. The constant temperature bath was changed to 55° F. (12.7° C.) and the mixture held for 30 minutes. Charge E was prepared and added to the reaction mixture. The reaction mixture was stirred for 30 minutes. Charge G was added to the reaction mixture. The reaction mixture was stirred for 15 minutes. Charge H was prepared and added to the reaction mixture. The reaction mixture was stirred for 15 minutes. Charge I was added and the reaction mixture stirred for 15 minutes. The mixture was ready for coating.

A topcoat for the photothermographic layer was prepared as follows:

A cellulose acetate butyrate premix (A') solution was prepared in the following manner:

| Charge | Material | wt % |
|---|---|---|
| 1 | 2-Butanone | 76.05 |
| 2 | Methanol | 8.95 |
| 3 | Eastman cellulose acetate butyrate (CAB 171-15S) | 15.00 |
|   |   | 100.00% |

A 2500 g batch of coating material was prepared as follows: Charges 1 and 2 were added to a gallon jar. The jar was placed in a G. K. Heller Type 12P-3223 mixer and controller and stirred at 2000 rpm. Charge 3 was added and the solution stirred for 2 hours.

A calcium carbonate premix (B') was prepared as follows:

| Charge | Material | wt % |
|---|---|---|
| 1' | Cellulose acetate butyrate solution from above | 90.32 |
| 2' | Pfizer Superflex SF 200 CaCO₃ | 9.68 |
|   |   | 100.00% |

A 300 g batch of premix was prepared as follows: Charge 1' was placed in a 32 oz stainless steel Waring Blendor container equipped with cover. The container was placed onto a Waring Laboratory Blendor (Waring Products Division, Dynamics Corporation of America) equipped with a Variac adjustable power supply. The Variac was set to 30 and stirring was begun. Charge 2' was added, the Variac was set to 40, and the mixture dispersed for 45 minutes.

The final topcoat solution was prepared as follows:

| Charge | Material | wt % |
|---|---|---|
| A' | Cellulose acetate butyrate solution from above | 90.32 |
| B' | SF 200 premix from above | 48.65 |
| C' | 2-Butanone | 43.02 |
| D' | Methanol | 5.16 |
| E' | Rohm and Haas Acryloid A-21 | 0.30 |
| F' | 4-Methylphthalic acid | 0.27 |
| G' | Tetrachlorophthalic anhydride | 0.14 |
| H' | Antimottle Agent-1 | 0.51 |
|   |   | 100.00 |

A 600 g batch of finished topcoat solution was prepared as follows: Charges A', B', C', and D' were added to a 32 oz jar. The jar was placed in a G. K. Heller Type 12P-3223 mixer and controller and stirred at 1500 rpm Charge E', F', G', and H' were added in order, and the mixture stirred for 30 minutes. The solution was ready for coating.

Coating Procedure

All coatings were carried out under infrared safelight conditions, using a dual knife coater. The base was 7 mil (178 μm) thick 10 inch (25.4 cm) wide 3M Scotchpar TM polyester film. This base has a blue tint. The coating knife for the photothermographic emulsion was set at 4.1 mil (104 μm) above the base. The coating knife for the topcoat was set at 5.6 mil (142 μm) above the base). The coatings were dried for 4 minutes at 175° F. (79.4° C.) in a Blue M TM oven.

Example 5

Preparation of Sample with Antihalation Layer

The following sample was prepared with a dihydroperimidine squarylium dye used in an antihalation construction of this invention.

A cellulose acetate butyrate premix (A) was prepared as follows:

| Charge | Material | wt % |
|---|---|---|
| 1 | 2-Butanone | 87.28 |
| 2 | Eastman cellulose acetate butyrate (CAB 381-20) | 12.55 |
| 3 | Goodyear Vitel TM PE-200 polyester | 0.17 |
|   |   | 100.00% |

A 2500 g batch of premix was prepared as follows: Charge 1 was added to a gallon jar. The jar was placed in a G. K. Heller Type 12P-3223 mixer and controller and stirred at 2,000 rpm with a propeller blade. Charges 2 and 3 were added and the solution stirred for 2 hours.

A Syloid X 6000 premix (C) was prepared as follows:

| Charge | Material | wt % |
|---|---|---|
| 1' | 2-Butanone | 99.62 |
| 2' | W. R. Grace Syloid 74-X 6000 | 0.38 |
|   |   | 100.00 |

A 2500 g batch of premix was prepared as follows: Charges 1' and 2' were slurried in a gallon jar. The slurry was homogenized one pass at 4,000 psi in a homogenizer.

The antihalation coating was prepared as follows:

| Charge | Material | wt % |
|---|---|---|
| A | Cellulose acetate butyrate (CAB 381-20) premix | 78.67 |
| B | Squarylium dye 1a | 0.09 |
| B | 2-Butanone | 7.87 |
| C | Syloid X6000/butanone premix from above | 7.87 |
| D | Antistatic Agent-1 | 1.57 |
| D | 2-Butanone | 3.93 |
| | | 100.00 |

The finished antihalation solution was prepared as follows: Charge B was placed in a 4 oz jar and sonicated until it dissolved. Charge A was added and the solution shaken well. Charge C was added to the jar and shaken well. Charge D was added to the jar and the solution shaken well. The solution was ready to coat.

Coating Procedure

The antihalation solution was coated onto the backside of a sample of film prepared in Example 4. Coating was carried out under infrared safelight conditions, using a single knife coater. The coating knife was set at 3.0 mil (76.2 μm) above the base. The coating was dried for 4 minutes at 175° F. (79.4° C.) in a Blue M ™ oven.

Example 6

Preparation of Sample with Acutance Dye

The following sample was prepared with a dihydroperimidine squarylium dye as an acutance dye in a photothermographic article.

A photothermographic coating mixture was prepared containing the following components:

| Charge | Material | wt % |
|---|---|---|
| A | Squarylium dye 1a | 0.01 |
| B | 2-Butanone | 2.17 |
| C | Photothermographic coating mixture from Example 1 | 97.8 |
| | | 100.00% |

A 100 g batch of coating materials was prepared as follows: Charges A and B were placed in an 8 oz jar and sonicated until a solution formed. Charge B was added to the jar and the mixture shaken well. The solution was ready to coat.

A topcoat solution was prepared as described in Example 4 above.

Coating Procedure

The photothermographic emulsion was coated in a manner identical to that of Example 4.

Example 7

A photothermographic coating and topcoat was prepared as described in Example 1. However, in this example the substrate was 7 mil (178 μm) clear polyester film. The color of the coating was gray. This sample serves as a control.

Example 8

A photothermographic coating, topcoat, and antihalation layer was prepared as described in Example 2. However, in this example the substrate was 7 mil (178 μm) clear polyester film. The color of the coating was grayish-brown.

Example 9

A photothermographic coating, topcoat, and antihalation layer was prepared as described in Example 2. However the antihalation dye used was perimidine squarylium dye 1f. In addition, in this example the substrate was 7 mil (178 μm) clear polyester film. The color of the coating was grayish-brown.

Example 10

Evaluation of Samples

Samples of the coatings of Examples 4–9 were cut into 3.5 cm×21.5 cm strips. The strips were exposed through a laser sensitometer at 811 nm. The exposed strips were processed for 15 seconds at 250° F. (121° C.) in a hot roll processor. Sensitometry measurements were made on a custom-built, computer-scanned densitometer and are believed to be comparable to measurements obtainable from commercially available densitometers. Sensitometric results include Dmin, Dmax, Speed, and Contrast. The following results were obtained:

| Ex. | Dmin | Dmax | Speed 2 | Speed 3 | Ac-1 | Ac-3 |
|---|---|---|---|---|---|---|
| 4 | 0.26 | 4.22 | 1.90 | 1.50 | 4.62 | 3.86 |
| 5 | 0.24 | 4.26 | 1.72 | 1.32 | 4.39 | 3.94 |
| 6 | 0.26 | 4.17 | 1.66 | 1.23 | 4.39 | 3.05 |
| 7 | 0.11 | 4.12 | 1.69 | 1.30 | 4.44 | 4.01 |
| 8 | 0.11 | 4.08 | 1.52 | 1.11 | 4.27 | 4.21 |
| 9 | 0.11 | 4.00 | 1.53 | 1.10 | 4.15 | 3.57 |

$D_{min}$ is the average of eight lowest density values on the exposed side of the fiducial mark.
$D_{max}$ is the highest density value on the exposed side of the fiducial mark
Speed 2 is log 1/E + 4 corresponding to a density of 1.00 above $D_{min}$. (E is in ergs/cm$^2$)
Speed 3 is log 1/E + 4 corresponding to a density of 2.90 above $D_{min}$. (E is in ergs/cm$^2$)
Ac-1 is the slope of the line joining the density points 0.60 and 2.00 above $D_{min}$. Ac-1 stands for Average Contrast-1.
Ac-3 is the slope of the line joining the density points 2.40 and 2.90 above $D_{min}$. Ac-3 stands for Average Contrast-3.

The uv, visible, and near infrared absorbance of the samples were measured on a Hitachi U-3110 Spectrophotometer. The absorbance at 805 nm was measured.

| | Absorbance at 805 nm | |
|---|---|---|
| Example | Absorbance | Absorbance due to dye |
| 4 | 0.18 | — |
| 5 | 0.77 | 0.59 |
| 6 | 0.27 | 0.09 |
| 7 | 0.18 | — |
| 8 | 0.84 | 0.66 |
| 9 | 0.81 | 0.63 |

Measurement of Image Sharpness

Image sharpness was measured by exposing a test pattern (known as a Universal Test Pattern) on 8 inch×11 inch pieces of the coatings prepared in Examples 4–9. The device used to generate the images was a 3M Model 969 Laser Imager using a high powered 802 nm laser diode in place of the standard laser diode. The coatings were exposed to achieve a density of 3.10. Samples were developed for 15 seconds at 250° F. (121° C.) on a hot roll processor.

The images on the samples prepared in Examples 4–9 were examined visually by inspection of the alphanumeric characters and appearance of the image details. Samples prepared from Examples 5, 6, 8, and 9 appeared distinctly sharper than Examples 1 and 7, the samples containing no dihydroperimidine squarylium dye.

The samples were also evaluated using a microdensitometer to measure the vertical bar pattern of the universal test pattern image. The bar pattern has various regions containing line pairs of varying frequency, known as line pairs/mm. A Sharpness Transfer Function Modulation (STF) value was calculated from the maximum and minimum density values using the following formula:

Sharpness Transfer Function Modulation =

$$\frac{Dmax - Dmin}{Dmax + Dmin}$$

It is customary to plot Spatial Frequency (in line pairs/mm) along the x axis vs the value of STF along the y axis. The closer the plot is to a straight line, the sharper the image. The higher the modulation value, the sharper the image. A plot of the values shown below, indicates that the STF values for Examples 5, 6, 8, and 9 are "flatter" than those of Examples 4 and 7, the samples containing no squarylium dye.

| Example | Modulation vs Spatial Frequency Spatial Frequency (lp/mm) | | | | |
|---|---|---|---|---|---|
| | 0.61 | 1.53 | 2.0 | 3.0 | 6.0 |
| 4 | 0.82 | 0.79 | 0.74 | 0.65 | 0.29 |
| 5 | 0.87 | 0.86 | 0.86 | 0.83 | 0.38 |
| 6 | 0.86 | 0.84 | 0.81 | 0.76 | 0.34 |
| 7 | 0.83 | 0.77 | 0.72 | 0.60 | 0.24 |
| 8 | 0.89 | 0.89 | 0.88 | 0.84 | 0.35 |
| 9 | 0.89 | 0.87 | 0.86 | 0.82 | 0.33 |

Example 11

Dye/Binder antihalation coating solutions were prepared and coated onto 7 mil (178 μm) clear polyester film. The λmax and absorbance for each coating were measured. Each coating solution contained the following:

| Component | wt. |
|---|---|
| Dye | 0.0237 g |
| Cellulose Acetate Butyrate (Eastman CAB 381-20) | 1.0037 g |
| Polyester Resin (Goodyear Vitel TM PE-200) | 0.0014 g |
| 2-Butanone | 6.9824 g |

| Dye | λmax nm | Absorption |
|---|---|---|
| 1a | 812 | 2.25 |
| 1b | 804 | 2.9 |
| 1c | 812 | 2.81 |
| 1d | 814 | 2.7 |
| 1e | 814 | 0.58 |
| 1f | 812 | 2.09 |
| 3a | 798 | 1.68 |

Reasonable modifications and variations are possible from the foregoing disclosure without departing from the spirit or scope of the present invention as defined in the claims.

What is claimed is:
1. A photothermographic article comprising:
a support bearing an electromagnetic-radiation-sensitive silver halide material; and
a dihydroperimidine squarylium dye having the nucleus:

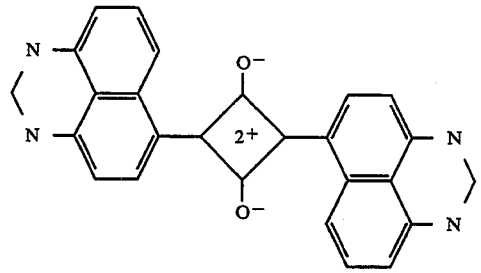

2. The photothermographic article of claim 1 wherein the dihydroperimidine squarylium dye has the nucleus:

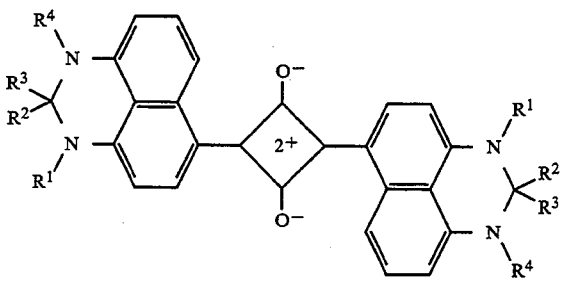

wherein,
$R^1$, $R^2$, $R^3$, and $R^4$ each independently represent hydrogen, an alkyl group having from 1-20 carbon atoms, a cycloalkyl group having from 1-20 carbon atoms, an aryl group having up to 14 carbon atoms, or
$R^1$ and $R^2$, and/or $R^3$ and $R^4$, or $R^2$ and $R^3$ taken together represent a 5-, 6-, or 7-membered ring.

3. The photothermographic article of claim 1 wherein the dihydroperimidine squarylium dye has the general formula:

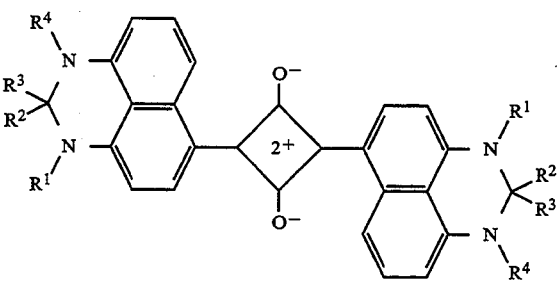

wherein,
$R^1$, $R^2$, $R^3$, and $R^4$ each independently represent hydrogen, an alkyl group having from 1-20 carbon atoms, a cycloalkyl group having from 1-20 carbon atoms, an aryl group having up to 14 carbon atoms, or
$R^1$ and $R^2$, and/or $R^3$ and $R^4$, or $R^2$ and $R^3$ taken together represent a 5-, 6-, or 7-membered ring.

4. The photothermographic article of claim 1 wherein the dihydroperimidine squarylium dye has the formula:

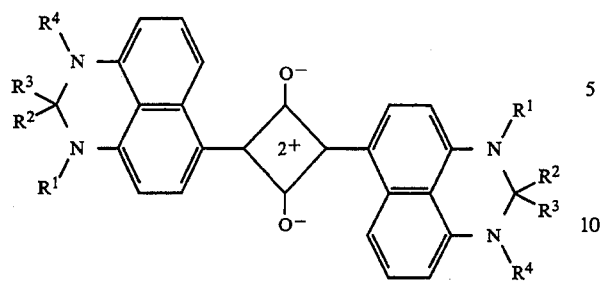
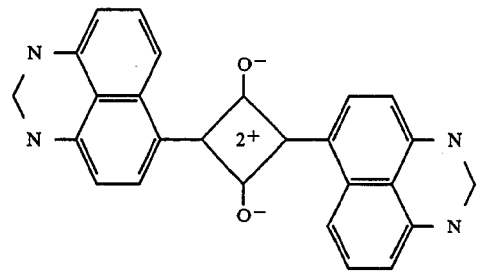

wherein:

$R^1$ and $R^4$ are hydrogen and $R^2$ and $R^3$ independently represent an alkyl group having from 1-20 carbon atoms, a cycloalkyl group having from 1-20 carbon atoms, an aryl group, or $R^2$ and $R^3$ taken together form a 5-, 6-, or 7-membered ring.

5. The photothermographic element of claim 4 in which $R^2$ and $R^3$ are taken together form a 5-, 6-, or 7-membered ring.

6. The photothermographic element of claim 1 in which the dihydroperimidine squarylium dye has the formula:

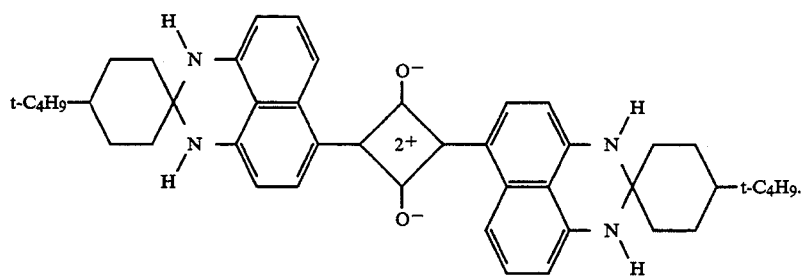

7. The photothermographic article of claim 1 wherein the dihydroperimidine squarylium dye is incorporated in an antihalation layer.

8. The photothermographic article of claim 1 wherein the dihydroperimidine squarylium dye is incorporated in the photosensitive layer as an acutance dye.

9. The photothermographic article of claim 1 in which said silver halide material is infrared-sensitive.

10. The photothermographic article of claim 1 in which the support is a clear material.

11. The photothermographic article of claim 1 having a grayish-brown tint.

12. The photothermographic article of claim 1 in which said dye is present in an amount sufficient to provide an optical density of from 0.05 to 3.0 absorbance units at λmax of the dye.

13. A photographic article comprising:
a support bearing an electromagnetic-radiation-sensitive silver halide material; and
a dihydroperimidine squarylium dye having the nucleus:

14. The photographic article of claim 13 wherein the dihydroperimidine squarylium dye has the formula:

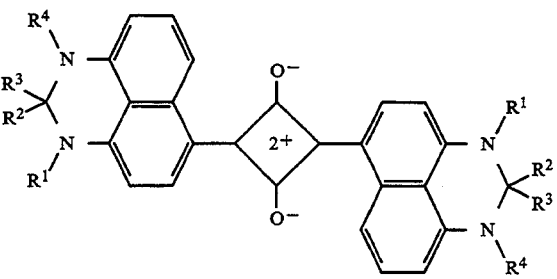

1f wherein
$R^1$, $R^2$, $R^3$, and $R^4$ each independently represent hydrogen, an alkyl group having from 1-20 carbon atoms, a cycloalkyl group having from 1-20 carbon atoms, an aryl group having up to 14 carbon atoms, or
$R^1$ and $R^2$, and/or $R^3$ and $R^4$, or $R^2$ and $R^3$ are taken together represent a 5-, 6-, or 7-membered ring.

15. The photographic article of claim 13 wherein the dihydroperimidine squarylium dye has the formula:

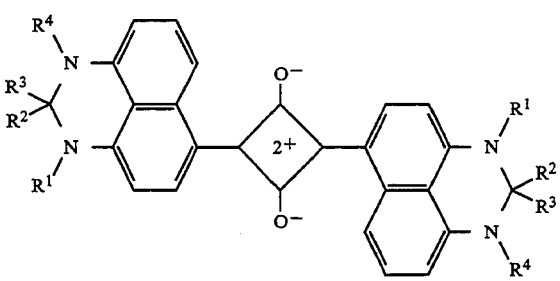

wherein:

$R^1$ and $R^4$ are hydrogen and $R^2$ and $R^3$ independently represent an alkyl group having from 1-20 carbon atoms, a cycloalkyl group having from 1-20 carbon atoms, an aryl group, or R² and R³ taken together from a 5-, 6-, or 7-membered ring.

16. The photographic article of claim 13 wherein the dihydroperimidine squarylium dye is incorporated in an antihalation layer.

17. The photographic article of claim 13 wherein the dihydroperimidine squarylium dye is incorporated in the photosensitive layer as an acutance dye.

18. The photographic article of claim 13 in which said silver halide material is infrared-sensitive.

19. The photographic article of claim 13 in which the support is a clear material.

20. The photographic article of claim 13 having a grayish-brown tint.

21. The photographic article of claim 13 in which said dye is present in an amount sufficient to provide an optical density of from 0.05 to 3.0 absorbance units at λmax of the dye.

* * * * *

UNITED STATES PATENT AND TRADEMARK OFFICE
CERTIFICATE OF CORRECTION

PATENT NO. : 5,380,635
DATED : Jan. 10, 1995
INVENTOR(S) : Gomez et al.

It is certified that error appears in the above-indentified patent and that said Letters Patent is hereby corrected as shown below:

On the title page, under , attorney, agent or Firm delete "Waltern"
and insert --Walter--.

Column 15, line 30, delete "product filtered"
and insert --product was filtered--.

Column 26, line 28, delete "1f".

Signed and Sealed this

Eighth Day of August, 1995

Attest:

BRUCE LEHMAN

Attesting Officer

Commissioner of Patents and Trademarks